H. D. FLOWER, OF CHICAGO, ILLINOIS.

Letters Patent No. 83,615, dated November 3, 1868.

IMPROVED COMPOUND FOR KILLING INSECTS ON TREES.

The Schedule referred to in these Letters Patent and making part of the same.

*To all whom this may concern:*

Be it known that I, H. D. FLOWER, of Chicago, in the county of Cook, and State of Illinois, have invented a new and useful Compound for Killing Insects and Preserving Fruit-Trees; and I do hereby declare that the following is a full, clear, and exact description of the ingredients, and the method of compounding and applying the same.

The present invention relates to a composition, which is to be applied to fruit-trees, by making in them holes of suitable size, and putting the compound therein; and the ingredients and their proportions are as follows:

Iron filings, sixteen pounds; tartaric acid, four pounds; calomel, two pounds.

These ingredients are put in any suitable vessel and thoroughly mixed. They are then ready for use. One or more quarter-inch holes are bored into the tree, near the ground, and at the side of the heart, and on an angle of about twenty degrees, so as to hold the compound when dissolved. The hole is then filled nearly full of the compound, and closed with a cork. This completes the operation.

The application of these ingredients not only destroys all lice and insects infesting trees, as frequent experiments have proved, but gives a healthy, greenish color to the bark, and has a very stimulating effect on the germ of the fruit, and causes the tree to bear much more abundantly.

I am well apprised that iron and various compounds have been applied to trees in this manner, but find that the compound herein described produces chemical changes, when it comes in contact with the sap of the tree, that are not produced by any other compound, used for a similar purpose, of which I have any knowledge.

The beneficial results of iron as applied to trees are well known, but this ingredient alone does not effectually destroy lice or insects, and for this reason I add the calomel and tartaric acid, which accomplish this purpose, and render the tree much stronger, as the several ingredients are soon dissolved and carried by the sap to all parts of the tree.

Having thus fully described my invention,

What I claim, and desire to secure by Letters Patent of the United States, is—

The ingredients herein named, compounded and applied substantially as and for the purpose set forth.

H. D. FLOWER.

Witnesses:
G. L. CHAPIN,
A. HAYWARD.